US010986591B2

United States Patent
MolavianJazi et al.

(10) Patent No.: US 10,986,591 B2
(45) Date of Patent: Apr. 20, 2021

(54) TRANSMISSION POWER FOR DUAL CONNECTIVITY

(71) Applicant: Lenovo (Singapore) PTE. LTD., New Tech Park (SG)

(72) Inventors: Ebrahim MolavianJazi, Lincolnwood, IL (US); Vijay Nangia, Woodridge, IL (US); Hyejung Jung, Northbrook, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/835,009

(22) Filed: Mar. 30, 2020

(65) Prior Publication Data

US 2020/0329437 A1 Oct. 15, 2020

Related U.S. Application Data

(60) Provisional application No. 62/826,970, filed on Mar. 29, 2019.

(51) Int. Cl.
*H04W 52/34* (2009.01)
*H04W 52/36* (2009.01)
*H04W 76/15* (2018.01)

(52) U.S. Cl.
CPC ......... *H04W 52/34* (2013.01); *H04W 52/367* (2013.01); *H04W 76/15* (2018.02)

(58) Field of Classification Search
CPC .......................... H04W 52/346; H04W 52/367
USPC .......... 455/522, 69, 422.1, 446, 452.1, 67.11
See application file for complete search history.

(56) References Cited

U.S. PATENT DOCUMENTS

2016/0021618 A1   1/2016  Yin
2016/0323834 A1*  11/2016 Rahman .............. H04W 52/146
2020/0053659 A1*  2/2020  Wang ................ H04W 72/1268
(Continued)

FOREIGN PATENT DOCUMENTS

EP   3439377 A2    6/2019
WO   2015116866 A1  8/2015

OTHER PUBLICATIONS

Qualcomm Incororated, "Discussion of RAN2 LS on PHR Procedure in Dual-Connectivity", 3GPP TSG RAN WG1 #96 R1-1902965, Feb. 25-Mar. 1, 2019, pp. 1-3.

(Continued)

*Primary Examiner* — John J Lee
(74) *Attorney, Agent, or Firm* — Kunzler Bean & Adamson

(57) ABSTRACT

Apparatuses, methods, and systems are disclosed for transmission power for dual connectivity. One method includes operating a UE with DC comprising connectivity with a first cell group and a second cell group; receiving a configuration message configuring the UE with a first maximum transmission power for transmissions on the first cell group, and a second maximum transmission power for transmissions on the second cell group; determining, at a UE, a transmission time for a first transmission on a first serving cell of the first cell group; and determining a cut-off time for power determination for the first transmission, wherein the cut-off time is based on the transmission time for the first transmission offset by an offset time, and the offset time is based on a function of a first UE processing time and a second UE processing time.

20 Claims, 4 Drawing Sheets

(56) References Cited

U.S. PATENT DOCUMENTS

2020/0092930 A1* 3/2020 Jang ..................... H04W 76/15
2020/0351801 A1* 11/2020 Jeon ..................... H04W 52/50

OTHER PUBLICATIONS

ZTE, "Draft CR on obtaining P0_Nominal for virtual PHR on SCell without RACH", 3GPP TSG RAN WG1 Meeting #96 R1-1901928, Feb. 25-Mar. 1, 2019, pp. 1-3.

3GPP, "3rd Generation Partnership Project; Technical Specification Group Radio Access Network; NR; Medium Access Control (MAC) protocol specification (Release 15)", 3GPP TS 38.321 V15.4.0, Dec. 2018, pp. 1-77.

3GPP, "3rd Generation Partnership Project; Technical Specification Group Radio Access Network; NR; Physical channels and modulation (Release 15)", 3GPP TS 38.211 V15.4.0, Dec. 2018, pp. 1-96.

3GPP, "3rd Generation Partnership Project; Technical Specification Group Radio Access Network; NR; Physical layer procedures for control (Release 15)", 3GPP TS 38.213 V15.4.0, Dec. 2018, pp. 1-104.

3GPP, "3rd Generation Partnership Project; Technical Specification Group Radio Access Network; NR; Physical layer procedures for data (Release 15)", 3GPP TS 38.214 V15.4.0, Dec. 2018, pp. 1-102.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.4.0, Dec. 2018, pp. 1-550.

3GPP, "3rd Generation Partnership Project; Technical Specification Group Radio Access Network; NR; Requirements for support of radio resource management (Release 15)", 3GPP TS 38.133 V15.4.0, Dec. 2018, pp. 1-876.

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.4.0, Dec. 2018, pp. 1-230.

3GPP, "3rd Generation Partnership Project; Technical Specification Group Radio Access Network; NR; User Equipment (UE) radio transmission and reception; Part 2: Range 2 Standalone (Release 15)", Dec. 2018, pp. 1-131.

3GPP, "3rd Generation Partnership Project; Technical Specification Group Radio Access Network; NR; User Equipment (UE) radio transmission and reception; Part 3: Range 1 and Range 2 Interworking operation with other radios (Release 15)", 3GPP TS 38.101-3 V15.4.0, Dec. 2018, pp. 1-216.

Samsung, Summary of NR UL power control-CA/DC aspects, 3GPP TSG RAN WG1 Meeting #94 R1-1809778, Aug. 20-24, 2018, pp. 1-11.

Qualcomm Incorporated, Summary for Uplink Power Control for Supporting NR-NR Dual Connectivity, 3GPP TSG-RAN WG1 Meeting #96 R1-1903778, Feb. 25-Mar. 1, 2019, pp. 1-11.

Motorola Mobility, Lenovo, "Uplink power control for NR-NR dual-connectivity", 3GPP TSG RAN WG1 #96 R1-1902851, Feb. 25-Mar. 1, 2019, pp. 1-7.

* cited by examiner

TRANSMISSION POWER FOR DUAL CONNECTIVITY

CROSS-REFERENCE TO RELATED APPLICATIONS

This application claims priority to U.S. Patent Application Ser. No. 62/826,970 entitled "APPARATUSES, METHODS, AND SYSTEMS FOR DYNAMIC POWER SHARING FOR NR DUAL CONNECTIVITY" and filed on Mar. 29, 2019 for Ebrahim MolavianJazi, which is incorporated herein by reference in its entirety.

FIELD

The subject matter disclosed herein relates generally to wireless communications and more particularly relates to transmission power for dual connectivity.

BACKGROUND

The following abbreviations are herewith defined, at least some of which are referred to within the following description: Third Generation Partnership Project ("3GPP"), 5$^{th}$ Generation ("5G"), QoS for NR Communication ("5QI/PQI"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Cell Group ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Dual Connectivity ("DC"), Downlink Control Information ("DCI"), Downlink ("DL"), Demodulation Reference Signal ("DMRS"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), E-UTRA-NR Dual Connectivity ("EN-DC"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multi-Radio Dual Connectivity ("MR-DC"), Multiple Access ("MA"), Medium Access Control ("MAC"), Multimedia Broadcast Multicast Services ("MBMS"), Master Cell Group ("MCG"), Minimum Communication Range ("MCR"), Modulation Coding Scheme ("MCS"), Minimum Guaranteed Power ("MGP"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Multi-radio Dual-Connectivity ("MR-DC"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR-EUTRA Dual Connectivity ("NE-DC"), NR-NR Dual Connectivity ("NN-DC", or "NR-DC", or "NR-NR DC"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Power Control Mode 1 ("PCM-1"), Power Control Mode 2 ("PCM-2"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PS- Cell"), Physical Sidelink Feedback Control Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, dual connectivity may be used.

BRIEF SUMMARY

Methods for transmission power for dual connectivity are disclosed. Apparatuses and systems also perform the functions of the methods. One embodiment of a method includes operating a user equipment with dual connectivity comprising connectivity with a first cell group and a second cell group. In certain embodiments, the method includes receiving a configuration message configuring the user equipment with a first maximum transmission power for transmissions on the first cell group, and a second maximum transmission power for transmissions on the second cell group. In some embodiments, the method includes determining, at a user equipment, a transmission time for a first transmission on a first serving cell of the first cell group. In various embodiments, the method includes determining a cut-off time for power determination for the first transmission, wherein the cut-off time is based on the transmission time for the first transmission offset by an offset time, and the offset time is based on a function of a first user equipment processing time and a second user equipment processing time. In certain embodiments, the method includes determining at least a second transmission on a second serving cell of the second cell group that overlaps with the first transmission, wherein scheduling information, transmission information, or a combination thereof of the at least second transmission is known before the cut-off time for power determination. In some embodiments, the method includes determining a maximum transmission power for the first transmission based on the received first maximum transmission power for transmissions on the first cell group, a total transmission power allocated to the at least second transmission on the second cell group, a configured maximum transmission power for dual connectivity operation, or some combination thereof. In various embodiments, the method includes performing the first transmission based on the determined maximum transmission power.

One apparatus for transmission power for dual connectivity includes a user equipment, wherein the apparatus further comprises: a processor that operates the apparatus with dual connectivity comprising connectivity with a first cell group and a second cell group; and a receiver that receives a configuration message configuring the apparatus with a first maximum transmission power for transmissions on the first cell group, and a second maximum transmission power for transmissions on the second cell group; wherein the processor: determines a transmission time for a first transmission on a first serving cell of the first cell group; determines a cut-off time for power determination for the first transmission, wherein the cut-off time is based on the transmission time for the first transmission offset by an offset time, and the offset time is based on a function of a first user equipment processing time and a second user equipment processing time; determines at least a second transmission on a second serving cell of the second cell group that overlaps with the first transmission, wherein scheduling information, transmission information, or a combination thereof of the at least second transmission is known before the cut-off time for power determination; determines a maximum transmission power for the first transmission based on the received first maximum transmission power for transmissions on the first cell group, a total transmission power allocated to the at least second transmission on the second cell group, a configured maximum transmission power for dual connectivity operation, or some combination thereof; and performs the first transmission based on the determined maximum transmission power.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
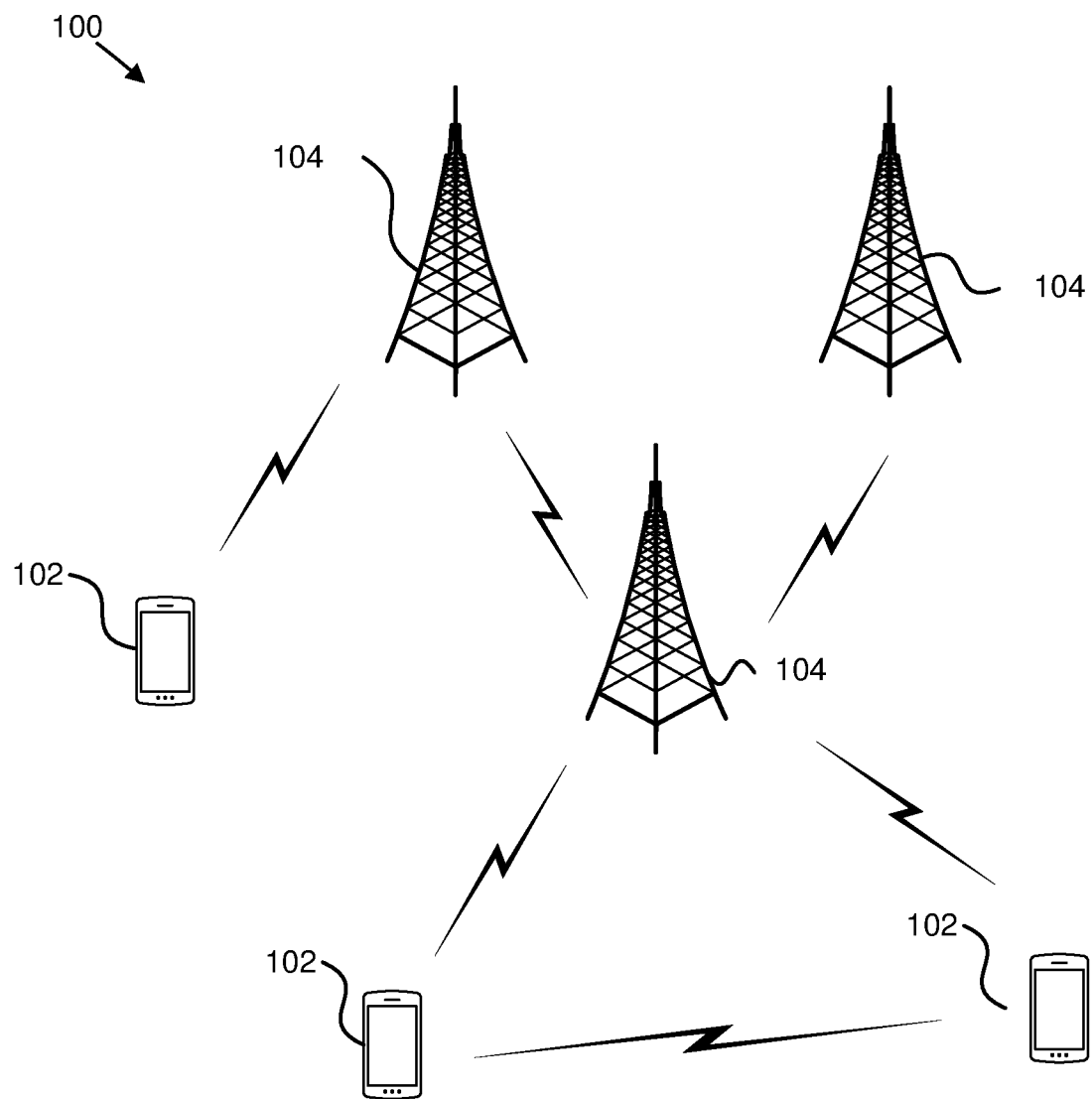
FIG. 1 is a schematic block diagram illustrating one embodiment of a wireless communication system for transmission power for dual connectivity.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps.

The description of elements in each figure may refer to elements of proceeding figures. Like numbers refer to like elements in all figures, including alternate embodiments of like elements.

FIG. 1 depicts an embodiment of a wireless communication system 100 for transmission power for dual connectivity. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may operate with dual connectivity comprising connectivity with a first cell group and a second cell group. In certain embodiments, the remote unit 102 may receive a configuration message configuring the remote unit 102 with a first maximum transmission power for transmissions on the first cell group, and a second maximum transmission power for transmissions on the second cell group. In some embodiments, the remote unit 102 may determine a transmission time for a first transmission on a first serving cell of the first cell group. In various embodiments, the remote unit 102 may determine a cut-off time for power determination for the first transmission, wherein the cut-off time is based on the transmission time for the first transmission offset by an offset time, and the offset time is based on a function of a first user equipment processing time and a second user equipment processing time. In certain embodiments, the remote unit 102 may determine at least a second transmission on a second serving cell of the second cell group that overlaps with the first transmission, wherein scheduling information, transmission information, or a combination thereof of the at least second transmission is known before the cut-off time for power determination. In some embodiments, the remote unit 102 may determine a maximum transmission power for the first transmission based on the received first maximum transmission power for transmissions on the first cell group, a total transmission power allocated to the at least second transmission on the second cell group, a configured maximum transmission power for dual connectivity operation, or some combination thereof. In various embodiments, the remote unit 102 may perform the first transmission based on the determined maximum transmission power. Accordingly, the remote unit 102 may be used for transmission power for dual connectivity.

Figure 2:
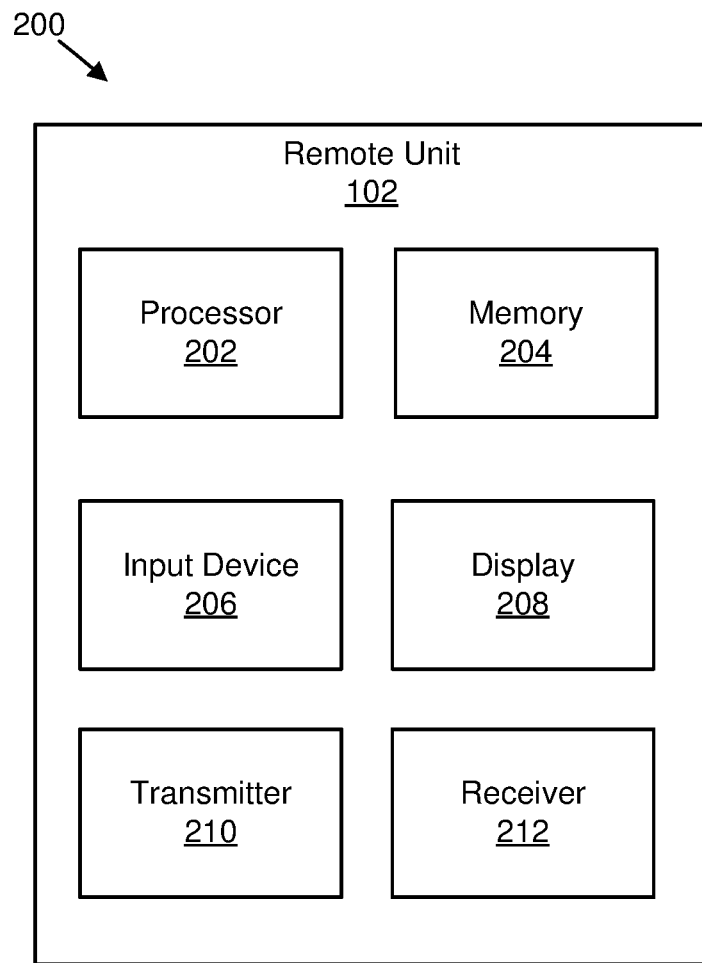
FIG. 2 is a schematic block diagram illustrating one embodiment of an apparatus that may be used for transmission power for dual connectivity.

FIG. 2 depicts one embodiment of an apparatus 200 that may be used for transmission power for dual connectivity. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the processor 202 may operate the remote unit 102 with dual connectivity comprising connectivity with a first cell group and a second cell group. In various embodiments, the receiver 212 may receive a configuration message configuring the remote unit 102 with a first maximum transmission power for transmissions on the first cell group, and a second maximum transmission power for transmissions on the second cell group. In certain embodiments, the processor 202: determines a transmission time for a first transmission on a first serving cell of the first cell group; determines a cut-off time for power determination for the first transmission, wherein the cut-off time is based on the transmission time for the first transmission offset by an offset time, and the offset time is based on a function of a first user equipment processing time and a second user equipment processing time; determines at least a second transmission on a second serving cell of the second cell group that overlaps with the first transmission, wherein scheduling information, transmission information, or a combination thereof of the at least second transmission is known before the cut-off time for power determination; determines a maximum transmission power for the first transmission based on the received first maximum transmission power for transmissions on the first cell group, a total transmission power allocated to the at least second transmission on the second cell group, a configured maximum transmission power for dual connectivity operation, or some combination thereof; and performs the first transmission based on the determined maximum transmission power.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
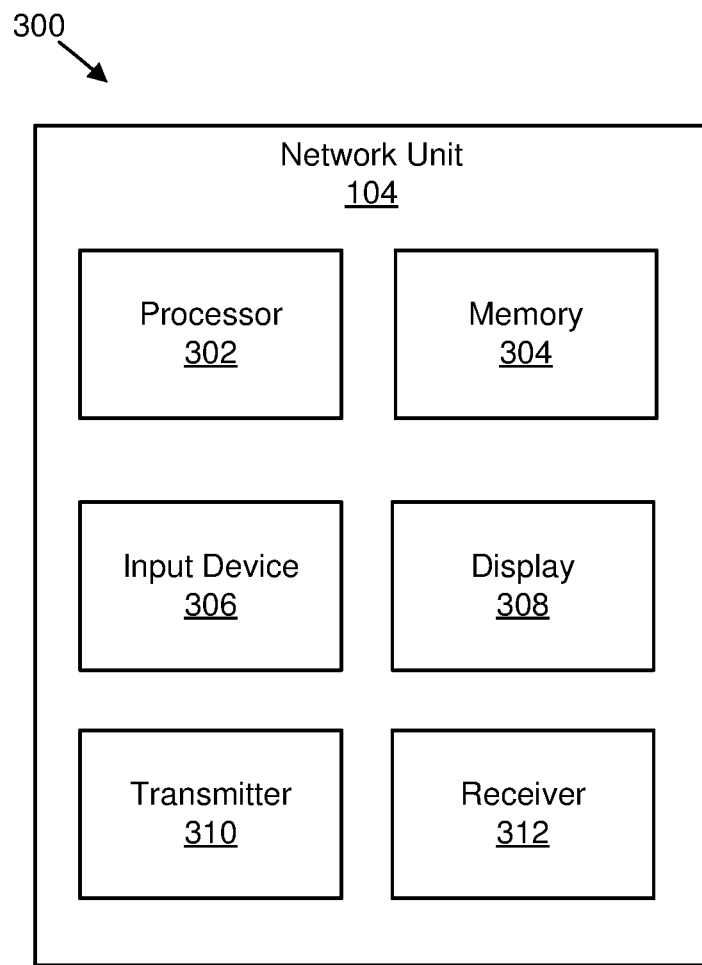
FIG. 3 is a schematic block diagram illustrating one embodiment of an apparatus that may be used for transmission power for dual connectivity.

FIG. 3 depicts one embodiment of an apparatus 300 that may be used for transmission power for dual connectivity. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, DC operation may be used to allocate power between two CGs. In various embodiments, such as in LTE-DC, two modes of operation may be used: a) PCM-1 for synchronous LTE-DC in which power is allocated based on priority levels of channels and/or signals and there is an MGP for each CG; and b) PCM-2 for asynchronous LTE-DC in which power is allocated based on a first-come first-serve principle and there is an MGP for each CG.

In certain embodiments, such as in LTE and NR coexistence (e.g., MR-DC), each CG may be configured with a maximum power limit (e.g., P_LTE and P_NR), and in a power-limited situation, LTE power setting may not be changed and NR performs a power scaling or dropping, if needed. In some embodiments, if there is semi-static knowledge of no overlap between LTE and NR, a maximum limit for CGs may be differently configured.

In various embodiments, power sharing may be considered dynamic power sharing if power for one CG is adjusted based on power in the other CG. In certain embodiments, to support dynamic power sharing for NR-DC (e.g., NR-NR DC or NN-DC) in which both CGs are NR RAT (e.g., in an FR1+FR1 band combination or an FR2+FR2 band combination), timing relationships and detailed power sharing schemes (e.g., how to handle priority levels across the two CGs) may be important.

Described herein are various details for dynamic power sharing for NR-DC. In some embodiments, time-references used for power determination of different UL channels and/or signals for dynamic power sharing may be with or without look-ahead. In various embodiments, dynamic power sharing (e.g., with and without look-ahead) may include how to allocate power and how to apply priority rules.

As may be appreciated, embodiments described herein may be in the context of 3GPP 5G NR, but may be applied to other wireless technologies. In certain embodiments, default power control settings for virtual PHR (e.g., both PUSCH and SRS) are used.

Certain embodiments described herein include timing relationships for different UL signals and/or channels in NR-DC dynamic power sharing without look-ahead.

In some embodiments, a closed-loop value for virtual PHR in NR may be used. In various embodiments, in NR, f(i,l) may not be clearly defined for a reference UL transmission. In certain embodiments: a) a reference transmission may be considered a configured transmission and f(i,l) may be calculated to include TPC command min{k2} slots before a reference slot; and/or b) the reference transmission may be scheduled by a virtual DCI that ends at a time of a PHR trigger and has no TPC command, and f(i,l) is calculated to include the TPC commands up to the time of PHR trigger.

In various embodiments, f(i,l) includes TPC accumulation up to any time in between a PHR trigger and min{k2} slots prior to a reference slot.

In certain embodiments, a cell-specific open-loop value P0_PUSCH_nominal may be used for virtual PUSCH PHR (e.g., Type-1 PHR) in a secondary serving cell without PRACH configuration. In some embodiments, such as for virtual type 1 PHR, a cell specific target received power is obtained via $P_{O\_NOMINAL\_PUSCH,\ f,c}(0)$ which is used for Msg3 and defined as $P_{O\_NOMINAL\_PUSCH\ f,c}(0) = P_{O\_PRE} + \Delta_{PREAMBLE\_Msg\ 3}$ in which the parameter preambleReceived-TargetPower (for $P_{O\_PRE}$ and msg3-DeltaPreamble (for $\Delta_{PREAMBLE\_Msg3}$ are provided by higher layers, or $\Delta_{PREAMBLE\_Msg3} = 0$ dB if msg3-DeltaPreamble is not provided, for carrier f of serving cell C. In such embodiments, because Msg3 is a message for RACH, there is no need to configure RACH on all serving cells. For those serving cells which have no RACH configured, the UE cannot get the parameter preambleReceivedTargetPower (for $P_{O\_PRE}$). In some embodiments, such as for serving cells which have no preambleReceivedTargetPower configured, a UE uses a parameter $P_{O\_NOMINAL\_PUSCH, fc}$ (0) for non SUL carrier f and primary cell c for virtual PHR calculation.

In various embodiments there are different settings for open-loop and closed-loop for virtual PHR.

In embodiments described herein, an "earlier" UL/PUSCH transmission may refer to an UL/PUSCH transmission that starts earlier in time or ends earlier in time or both. Moreover, in embodiments described herein, an "earliest" UL/PUSCH transmission among a number of UL/PUSCH transmissions may refer to a PUSCH transmission that starts the earliest in time or ends the earliest in time or both. In one example, the earlier/earliest PUSCH transmission includes repetitions (e.g., mini-slot repetition, or multi-segment transmission) of a TB/UCI (e.g., if there is a PUSCH without data).

In certain embodiments, if semi-static power sharing for NR-DC is supported in addition to dynamic power sharing, the two types of power sharing may be based on a "power sharing mode" parameter that is RRC configured, a selection by RRC on which parameter sets to configure (e.g., configure only maximum power limits for semi-static power sharing while configuring only MGPs or both MGPs and max power limits for dynamic power sharing), or based on a UE capability that the UE reports. These configurations/capabilities may be the same or different for synchronous and asynchronous NR-DC. In some embodiment, maximum power limits may always be configured for both semi-static and dynamic power sharing, and it may be checked to determine whether $P_{MCG, max}+P_{SCG, max}<=P_{NR-DC, Total}$ (for semi-static power sharing) or $>P_{NR-DC, Total}$ (for dynamic power sharing).

Embodiments described herein may be described in the context of NR-DC (e.g., NR-NR DC, or NN-DC), but may also be applicable to EN-DC, NE-DC, MR-DC, NR-CA, and any other dual-connectivity or carrier-aggregation configurations.

In various embodiments, if there is a power-limited situation (e.g., $P_{MCG}+P_{SCG}>P_{NR-DC, Total}$), a UE may allocate power for an UL transmission by: a) considering allocated powers for overlapping transmissions whose power are already determined—regardless of priority levels; b) assigning power to higher priority overlapping transmissions whose power is concurrently determined; and/or c) respecting the MGPs such that total power on a first cell group can never exceed $P_{NR-DC, Total}-P_{CG2, min}$.

In view of flexible numerology and transmission timing/length in NR, embodiments described herein may be used for both synchronous and asynchronous NR-DC configurations.

In certain embodiments, such as for dynamic power sharing, when to decide and/or determine transmit power (e.g., whether to perform any power scaling or dropping in a power limited situation) may be important. Such embodiments may be performed by the following: a) dynamic power sharing without look-ahead in which the transmit power is determined and/or decided at a scheduling, triggering, and/or configuration time instant; and/or b) dynamic power sharing with look-ahead in which the transmit power is determined and/or decided later than the scheduling, triggering, and/or configuration time instant (e.g., at a certain cut-off time to be clarified).

In some embodiments, such as for dynamic power sharing without look-ahead, a first option and a second option for timing relationships may be used to enforce no look-ahead.

In the first option, if determining a total transmit power in a symbol of transmission occasion i, a UE may not include power for transmissions (e.g., on the same CG or the other CG) starting after the symbol of transmission occasion i.

In the second option, if determining a transmit power for a transmission occasion i, the UE may not include power for UL transmissions (e.g., on the same CG or the other CG) if scheduling, triggering, and/or configuration information is received at the UE after a time at which the scheduling, the triggering, and/or the configuration information for transmission occasion i is received. In some embodiments, time references (or cut-off times) may be considered for different UL transmissions, so that the UE determines the power for an UL transmission only based on the higher layer signaling for UL transmissions and downlink control information received before and up to: a) a reception time of a PDCCH (e.g., end of a reception of a last symbol of the PDCCH carrying DCI associated with the transmission, or beginning of the reception of the first and/or starting symbol of the PDCCH carrying the DCI associated with the transmission) for a dynamically scheduled PUSCH, for aperiodic-SRS or for PUCCH carrying HARQ-ACK; b) the starting symbol of the UL transmission minus one of (i) minimum common configured K2 value (e.g., the minimum of the values provided by k2 in PUSCH-ConfigCommon value in slots; or in terms of number of symbols a number of symbols equal to the product of a number of symbols per slot, $N_{symb}^{slot}$, and the minimum of the values provided by k2), (ii) PUSCH processing/preparation time $T_{proc,2}$, (iii) the updated version of PUSCH processing/preparation time $T'_{proc,2}$ as used to define PHR cut-off time for configured grant PUSCH, (iv) UE processing time parameter N2 based on UE capability, (v) a number of [Y] symbols, where [Y] is specified or configured or reported as a UE capability, or a combination and/or function thereof, for a configured-grant PUSCH, for periodic SRS and/or semi-persistent SRS, or for PUCCH without HARQ-ACK (these time-references and/or cut-off times may be applicable with and without look-ahead); c) the last symbol of PDCCH that schedules and/or is in response to a transmission of a PUCCH or a corresponding previous PDSCH plus in some embodiments one of (i) UE processing time parameter N1 based on UE capability, (ii) UE processing time parameter N2 based on UE capability, (iii) $T_{proc,1}^{mux}$, $T_{proc,2}^{mux}$, $T_{proc,CSI}^{mux}$, $T_{proc,CSI}$, or $Z'_{pro,CSI}^{mux}$ for UCI multiplexing, (iii) a number of [X] symbols/slots, where [X] is specified, configured, or reported as a UE capability, or a combination and/or function thereof (in some embodiments, no additional time is added to the last symbol of PDCCH that schedules and/or is in response to a transmission of a PUCCH or a corresponding previous PDSCH) for PUCCH, PUCCH overlapping with PUSCH, UCI multiplexing, or a PUCCH group; d) the starting symbol of PUCCH or PUSCH in response to a detected PDCCH, DCI format, or a corresponding previous PDSCH minus one of (i) UE processing time parameter N1 based on UE capability, (ii) UE processing time parameter N2 based on UE capability, (iii) $T_{proc,1}^{mux}$, $T_{proc,2}^{mux}$, $T_{proc,CSI}^{mux}$, $T_{proc,CSI}$, or $Z'_{proc,CSI}^{mux}$ for UCI multiplexing, (iii) a number of [X] symbols/slots, where [X] is specified or configured or reported as a UE capability, or a combination and/or function thereof for PUCCH, PUCCH overlapping with PUSCH, UCI multiplexing, or a PUCCH group; and/or e) the starting symbol of PRACH transmission minus one of (i) $\Delta_{Delay}$ for PRACH (e.g., for communication with higher layers), (ii) PUSCH processing time parameter N2 or $N_{T,2}$ based on UE capability, (iii) $\Delta_{BWPSwitching}$ for a BWP switching time, (v) a combination of items (i, ii) or (i, ii, iii) (e.g., their summation), (vi) minimum common configured K2 value, (vii) a number of [Y] symbols/slots in a numerology of an active BWP or in a reference numerology (e.g., 15 kHz) (e.g., Y=1 slot), or (viii) any combination thereof for PRACH in response to a PDCCH order or for PRACH that is not in response to a PDCCH order (which terms to use from the list above or how to combine some terms might depend on whether or not the PRACH is in response to a PDCCH order and/or these time-references and/or cut-off times may be applicable with and without look-ahead).

In some embodiments, for cross-carrier scheduling with and/or without different numerologies, parameters may be considered to belong to a scheduled cell (e.g., where a transmission takes place). In various embodiments, parameters may be considered to belong to (i) the scheduling cell, or (ii) the scheduled or scheduling cell that has the lower and/or the higher subcarrier spacing.

In certain embodiments, a PRACH cut-off time in LTE may be one subframe before a PRACH transmission as follows: if a transmission timing of the PRACH transmission is such that a UE is ready to transmit the PRACH at least one subframe before subframe i2 of CG2, $\hat{P}_{PRACH\_CG2}$(i2) is the linear value of the transmission power of that PRACH transmission; otherwise, $\hat{P}_{PRACH\_CG2}$(i2)=0.

In various embodiments, regarding a comparison between a power control algorithm for NR-CA and a power control algorithm for dynamic NR-DC power sharing, one of the following may be used: 1) an MCG may be a higher priority than a SCG regardless of priority levels of channels and/or signals (e.g., power allocation between MCG and SCG is decoupled) and the minimum guaranteed power on SCG may be configured such that (e.g., PUCCH and/or SRS on SCG may be protected); and 2) priority levels may be applied across the two CGs (e.g., PUCCH is always higher priority than PUSCH without UCI regardless of whether PUCCH and/or PUSCH are on MCS and/or SCG) (for two UL transmissions with the same priority level, MCG>SCG—the minimum guaranteed power and look-ahead may be applied on top of this to improve the performance).

In certain embodiments, priority rules may be applied across two CGs for overlapping transmissions whose power is concurrently determined so that an UL channel and/or signal with lower priority is power scaled and/or dropped even if located on an MCG. In such embodiments, for two UL channels and/or signals with the same priority level, MCG>SCG. Furthermore, in such embodiments, lower priority UL channels and/or signals whose power is already determined are not power scaled and/or dropped.

In some embodiments, regarding how a network can schedule power levels beyond minimum guaranteed levels without rolling a dice, it may be possible for each CG to be able to independently acquire, estimate, and/or learn required statistics of the other CG scheduling behavior (e.g., based on PHR and/or an observation of a history of previous scheduling and transmission outcomes). Such embodiments may enable each CG to push an RB allocation and/or MCS selection beyond a guaranteed power (e.g., 20 dBm), and close to (but not necessarily equal to) a maximum UE output power (e.g., 23 dBm). In various embodiments, statistics may facilitate expressing whether drops come from a UE missing a grant vs. dynamic NR-DC power sharing. In certain embodiments, a network may configure (e.g., reconfigure) minimum and/or maximum limits over time to improve performance. In some embodiments, HARQ operation may facilitate recovering failed transmissions.

Various embodiments may use NR-DC dynamic power sharing without look-ahead. In one embodiment, if a transmit power for an UL transmission occasion i1 on a CG satisfies:

$$P(i1) > \min\left\{ \begin{array}{l} P_{NR-DC,Total} - P_{CG,min,other}, \\ P_{NR-DC,Total} - \sum_{i2:past} P(i2) - \sum_{i2:concurrent,high} P(i2) \end{array} \right\},$$

then, a UE reduces the transmit power for the UL transmission occasion i1 so that $$P(i1) \le \min\left\{ \begin{array}{l} P_{NR-DC,Total} - P_{CG,min,other}, \\ P_{NR-DC,Total} - \sum_{i2:past} P(i2) - \sum_{i2:concurrent,high} P(i2) \end{array} \right\},$$

where: P(i) denotes the transmit power for an UL transmission occasion i on a CG; $P_{NR-DC,Total}$ denotes a configured maximum power for NR-DC operation in a corresponding FR1+FR1 band combination.

In certain embodiments, for any given UL transmission occasion i1 on any CG, $P_{CG,min,other}$ denotes a configured minimum power, reserved power, and/or guaranteed power for another CG.

In some embodiments, for any given UL transmission occasion i on any CG, scheduling, triggering, and/or configuration information may correspond to a dynamic grant (e.g., DL or UL DCI) or higher layer signaling (e.g., RRC configuration for configured grant PUSCH) that schedules the UL transmission occasion i.

In various embodiments, for any given UL transmission occasion i1 on any CG, i2: past may refer to all UL transmission occasions i2 on the same CG or another CG that: a) overlap with transmission occasion i1; and b) whose scheduling, triggering, and/or configuration information is received at a UE before the scheduling, triggering, and/or configuration information for UL transmission occasion i1 is received at the UE.

In certain embodiments, the following time references (or cut-off times or triggering times) may be considered for different UL transmissions so that the UE determines power for an UL transmission only based on higher layer signaling for UL transmissions and downlink control information received before and up to: a) a reception time of a PDCCH (e.g., end of the reception of the last symbol of the PDCCH carrying the DCI associated with the transmission, or beginning of the reception of the first and/or starting symbol of the PDCCH carrying the DCI associated with the transmission) for a dynamically scheduled PUSCH, for aperiodic-SRS, or for PUCCH carrying HARQ-ACK; b) a starting symbol of the UL transmission minus one of (i) a minimum common configured K2 value (e.g., the minimum of the values provided by k2 in PUSCH-ConfigCommon value in slots, or in terms of a number of symbols—a number of symbols equal to the product of a number of symbols per slot, $N_{symb}^{slot}$, and the minimum of the values provided by k2), (ii) PUSCH processing and/or preparation time $T_{proc,2}$, (iii) an updated version of PUSCH processing and/or preparation time $T'_{proc,2}$ as used to define PHR cut-off time for a configured grant PUSCH, (iv) UE processing time parameter N2 based on UE capability, (v) a number of [Y] symbols, where [Y] is specified, configured, or reported as a UE capability, or a combination and/or function thereof, for a configured-grant PUSCH, for periodic SRS, semi-persistent SRS, or for PUCCH without HARQ-ACK; c) the last symbol of PDCCH that schedules and/or in response to which a transmission of a PUCCH or a corresponding previous PDSCH plus in some embodiments one of (i) UE processing time parameter N1 based on UE capability, (ii) UE processing time parameter N2 based on UE capability, (iii) $T_{proc,1}^{mux}$, $T_{proc,2}^{mux}$, $T_{proc,CSI}^{mux}$, $T_{proc,CSI}$, or $Z'_{proc,CSI}^{mux}$ for UCI multiplexing, (iii) a number of [X] symbols/slots, where [X] is specified or configured or reported as a UE capability, or a combination and/or function thereof (in some embodiments, no additional time is added to the last symbol of PDCCH that schedules and/or in response to which a transmission of a PUCCH or a corresponding previous PDSCH) for PUCCH, PUCCH overlapping with PUSCH, UCI multiplexing, or PUCCH group; and/or d) the starting symbol of PRACH transmission minus one of (i) $\Delta_{Delay}$ for PRACH (e.g., for communication with higher layers), (ii) PUSCH processing time parameter N2 or $N_{T,2}$ based on UE capability, (iii) $\Delta_{BWPSwitching}$ for BWP switching time, (v) a combination of items (i, ii) or (i, ii, iii) (e.g., their summation), (vi) minimum common configured K2 value, (vii) a number of [Y] symbols/slots in a numerology of an active BWP or in a reference numerology (e.g., 15 kHz) (e.g., Y=1 slot), or (viii) any combination thereof for PRACH in response to a PDCCH order or for PRACH that is not in response to a PDCCH order (which terms to use from the list above or how to combine some terms might depend on whether or not the PRACH is in response to a PDCCH order).

In some embodiments, for cross-carrier scheduling with and/or without different numerologies, parameters may be considered to belong to a scheduled cell (e.g., where a transmission takes place). In various embodiments, parameters may be considered to belong to (i) the scheduling cell, or (ii) the scheduled or scheduling cell that has the lower and/or the higher subcarrier spacing.

In certain embodiments, for any given UL transmission occasion i1 on any CG, i2: concurrent, high may denote all UL transmission occasions i2 on the same CG or another CG that: a) overlap with transmission occasion i1; b) whose scheduling, triggering, and/or configuration information is received by the UE at the same time if the scheduling, triggering, and/or configuration information for UL transmission occasion i1 is received at the UE; and/or c) which are higher priority than UL transmission occasion i1 per pre-defined priority order rules. In some embodiments, if there is the same priority order and for operation with dual connectivity, a UE prioritizes power allocation for transmissions on an MCG over transmissions on an SCG.

In various embodiments, if there are multiple transmission occasions i1 on the same CG that: overlap in time; are scheduled, triggered, and/or configured at the same time; and are at the same priority level per pre-defined priority order rules, then P(i1) denotes a total power for all such transmission occasions (e.g., the sum of the linear values of UE transmit powers for those UL transmission occasions). Power scaling or dropping among such transmission occasions may be up to UE implementation.

Various embodiments may use NR-DC dynamic power sharing with look-ahead. In one embodiment, if the transmit power for an UL transmission occasion i1 on a CG satisfies:

$$P(i1) > \min\left\{ \begin{array}{l} P_{NR-DC,Total} - P_{CG,min,other}, \\ P_{NR-DC,Total} - \sum_{i2:past} P(i2) - \sum_{i2:concurrent,high} P(i2) \end{array} \right\},$$

then, the UE reduces the transmit power for the UL transmission occasion i1 so that $$P(i1) \le \min\left\{ \begin{array}{l} P_{NR-DC,Total} - P_{CG,min,other}, \\ P_{NR-DC,Total} - \sum_{i2:past} P(i2) - \sum_{i2:concurrent,high} P(i2) \end{array} \right\},$$

where: P(i) denotes the transmit power for an UL transmission occasion i on a CG; $P_{NR-DC,Total}$ denotes a configured maximum power for NR-DC operation in a corresponding FR1+FR1 band combination.

In certain embodiments, for any given UL transmission occasion i1 on any CG, $P_{CG,min,other}$ denotes a configured minimum power, reserved power, and/or guaranteed power for another CG.

In some embodiments, for any given UL transmission occasion i on any CG, scheduling, triggering, and/or configuration information may correspond to a dynamic grant (e.g., UL DCI) or higher layer signaling (e.g., RRC configuration for configured grant PUSCH) that schedules the UL transmission occasion i.

In various embodiments, for any given UL transmission occasion i1 on any CG, NR-DC power determination cut-off time may be a last symbol at which transmit power for the UL transmission occasion i1 is decided and cannot be re-adjusted after that. It may be defined in terms of a number of [X] symbols after scheduling, triggering, and/or configuration information for UL transmission occasion i1 is received at the UE, or as a number of [Y] symbols before the start of the UL transmission occasion i1, where [X] and [Y] may be specified, configured, or reported as a UE capability. One possible value for [Y] is $T'_{proc,2}$.

In certain embodiments, the following time references (or cut-off times or triggering times) may be considered for different UL transmissions so that the UE determines power for an UL transmission only based on the higher layer signaling for UL transmissions and downlink control information received before and up to: a) a starting symbol of the UL transmission minus one of (i) a minimum common configured K2 value (e.g., the minimum of the values provided by k2 in PUSCH-ConfigCommon value in slots, or in terms of a number of symbols—a number of symbols equal to the product of a number of symbols per slot, $N_{symb}^{slot}$, and the minimum of the values provided by k2), (ii) PUSCH processing and/or preparation time $T_{proc,2}$, (iii) an updated version of PUSCH processing and/or preparation time $T'_{proc,2}$ as used to define PHR cut-off time for a configured grant PUSCH, (iv) UE processing time parameter N2 based on UE capability, (v) a number of [Y] symbols, where [Y] is specified, configured, or reported as a UE capability, or a combination and/or function thereof, for a dynamically scheduled PUSCH, for aperiodic-SRS, or for PUCCH carrying HARQ-ACK; also for a configured-grant PUSCH, for periodic SRS, for semi-persistent SRS, or for PUCCH without HARQ-ACK; b) the last symbol of PDCCH that schedules and/or in response to which a transmission of a PUCCH or a corresponding previous PDSCH plus one of (i) UE processing time parameter N1 based on UE capability, (ii) UE processing time parameter N2 based on UE capability, (iii) $T_{proc,1}^{mux}$, $T_{proc,2}^{mux}$, $T_{proc,CSI}^{mux}$, $T_{proc,CSI}$, or $Z'_{proc,CSI}^{mux}$ for UCI multiplexing, (iii) a number of [X] symbols/slots, where [X] is specified or configured or reported as a UE capability, or a combination and/or function thereof, for PUCCH, PUCCH overlapping with PUSCH, UCI multiplexing, or a PUCCH group; c) the starting symbol of PUCCH or PUSCH in response to a detected PDCCH, DCI format, or a corresponding previous PDSCH minus one of (i) a UE processing time parameter N1 based on a UE capability, (ii) a UE processing time parameter N2 based on UE capability, (iii) $T_{proc,1}^{mux}$, $T_{proc,2}^{mux}$, $T_{proc,CSI}^{mux}$, $T_{proc,CSI}$, or $Z'_{proc,CSI}^{mux}$ for UCI multiplexing, (iii) a number of [X] symbols/slots, where [X] is specified or configured or reported as a UE capability, or a combination and/or function thereof, for PUCCH, PUCCH overlapping with PUSCH, UCI multiplexing, or a PUCCH group; and/or d) the starting symbol of PRACH transmission minus one of (i) $\Delta_{Delay}$ for PRACH (e.g., for communication with higher layers), (ii) PUSCH processing time parameter N2 or $N_{T,2}$ based on a UE capability, (iii) $\Delta_{BWPSwitching}$ for a BWP switching time, (v) a combination of items (i, ii) or (i, ii, iii) (e.g., their summation), (vi) a minimum common configured K2 value, (vii) a number of [Y] symbols/slots in the numerology of the active BWP or in a reference numerology (e.g., 15 kHz) (e.g., Y=1 slot), and/or (viii) some combination thereof, for PRACH in response to a PDCCH order or for PRACH that is not in response to a PDCCH order (which terms to use from the list above or how to combine some terms might depend on whether the PRACH is in response to a PDCCH order or not).

In some embodiments, for cross-carrier scheduling with and/or without different numerologies, parameters may be considered to belong to a scheduled cell (e.g., where a transmission takes place). In various embodiments, parameters may be considered to belong to (i) the scheduling cell, or (ii) the scheduled or scheduling cell that has the lower and/or the higher subcarrier spacing.

In certain embodiments, for any given UL transmission occasion i1 on any CG, i2: past may denote all UL transmission occasions i2 on the same CG or another CG that: a) overlap with transmission occasion i1; and b) whose power determination cut-off times are reached and/or expired before the power determination cut-off time for UL transmission occasion i1.

In various embodiments, for any given UL transmission occasion i1 on any CG, i2: concurrent, high may denote all UL transmission occasions i2 on the same CG or another CG that: a) overlap with transmission occasion i1; b) whose power determination cut-off times are after the power determination cut-off time for UL transmission occasion i1, but whose scheduling information is received at a UE before or up to the power determination cut-off time" for UL transmission occasion i1; and c) which are higher priority than UL transmission occasion i1 per pre-defined priority order rules. If a same priority order and for operation with dual connectivity, a UE prioritizes power allocation for transmissions on an MCG over transmissions on an SCG.

In some embodiments, if there are multiple transmission occasions i1 on the same CG that: overlap in time; whose power determination cut-off times are at the same time; and are at the same priority level per pre-defined priority order rules, then P(i1) denotes a total power for all such UL transmission occasions (e.g., a sum of linear values of UE transmit powers for those UL transmission occasions). Power scaling or dropping among such transmission occasions may be up to UE implementation.

Various embodiments may use settings for open-loop and closed-loop PC for virtual PHR.

In certain embodiments, a virtual PHR in a carrier aggregation scenario (or single-cell but with SUL if reporting one PHR per uplink carrier) may be a PHR with respect to a reference format UL transmission. In some embodiments, a $P_{O\_NOMINAL\_PUSCH,f,c}$ (e.g., a cell-specific component of P0) for PUSCH PHR (e.g., Type-1 PHR) may be based on P0_nominal_msg3 (or $P_{O\_NOMINAL\_PUSCH,f,c}(0)$). However, P0_nominal for Msg3 may only define a serving cell with RACH configuration. If RACH is not configured on a serving cell, then virtual PHR may be defined with respect to P0_nominal_PUSCH for grant-based PUSCH captured by p0-NominalWithGrant. This parameter may be safely assumed by a UE to be configured since a PUSCH PHR reporting implies that the UE is already configured for PUSCH and PUSCH power control parameters including p0-NominalWithGrant.

In various embodiments, a value of closed-loop adjustment state $f_{b,f,c}(i,1)$ may be defined for virtual PHR for both Type-1 PHR (e.g., PUSCH PHR) and Type-3 PHR (e.g., SRS PHR). For a virtual PHR, there may be no transmission occasion i scheduled or configured for a UE. In certain embodiments, a value of $f_{b,f,c}(i,1)=f_{b,f,c}(i-1,1)$ (e.g., a value of a CL-PC adjustment state at an immediately previous transmission occasion before PHR cut-off time, which is an actual scheduled and/or configured transmission occasion). In some embodiments, no TPC command value received after transmission occasion (i−1) is not accounted for. PHR cut-off time may be a time reference at which actual and/or virtual PHR is predetermined.

In various embodiments, for virtual Type-1 PHR (e.g., PUSCH PHR), if a UE determines that a Type 1 power headroom report for an activated serving cell is based on a reference PUSCH transmission then, for PUSCH transmission occasion i on active UL BWP b of carrier f of serving cell c, the UE computes the Type 1 power headroom report as $$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}[dB],$$

where $\tilde{P}_{CMAX,f,c}(i)$ is computed assuming MPR=0 dB, A-MPR=0 dB, P-MPR=0 dB. $\Delta$TC=0 dB. MPR, A-MPR, P-MPR, and $\Delta$TC may be predefined. The remaining parameters may be defined such that $P_{O\_PUSCH,b,f,c}(j)$ and $\alpha_{b,f,c}(j)$ are obtained using $P_{O\_NOMINAL\_PUSCH,f,c}(0)$ for an uplink carrier f of an activated serving cell c with RACH configuration, otherwise using $P_{O\_NOMINAL\_PUSCH,f,c}(j)$ value provided by p0-NominalWithGrant, and p0-PUSCH-Alpha-SetId=0, $PL_{b,f,c}(q_d)$ is obtained using PathlossReferenceRS-Id=0, and l=0 using $f_{b,f,c}(i,1)=f_{b,f,c}(i-1,1)$.

In some embodiments, for virtual Type-3 PHR (e.g., SRS PHR), if a UE determines that a Type 3 power headroom report for an activated serving cell is based on a reference SRS transmission then, for SRS transmission occasion i on UL BWP b of carrier f of serving cell c, and if the UE is not configured for PUSCH transmissions on UL BWP b of carrier f of serving cell c, the UE computes a Type 3 power headroom report as $$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}[dB],$$

where $q_s$ is a SRS resource set corresponding to SRS-ResourceSetId=0 for UL BWP b and $P_{O\_SRS,b,f,c}(q_s)$, $\alpha_{SRS,f,c}(q_s)$ $PL_{b,f,c}(q_d)$ and $h_{b,f,c}(i)$ are predefined with corresponding values obtained from SRS-ResourceSetId=0 for UL BWP b and using $h_{b,f,c}(i)=h_{b,f,c}(i-1)$. $\tilde{P}_{CMAX,f,c}(i)$ is computed assuming MPR=0 dB, A-MPR=0 dB, P-MPR=0 dB, and $\Delta$TC=0 dB. MPR, A-MPR, P-MPR and $\Delta$TC are predefined. Similar method of computation as applied to Type-1 PHR and Type-2 PHR may be applied to a Type-2 PHR.

Figure 4:
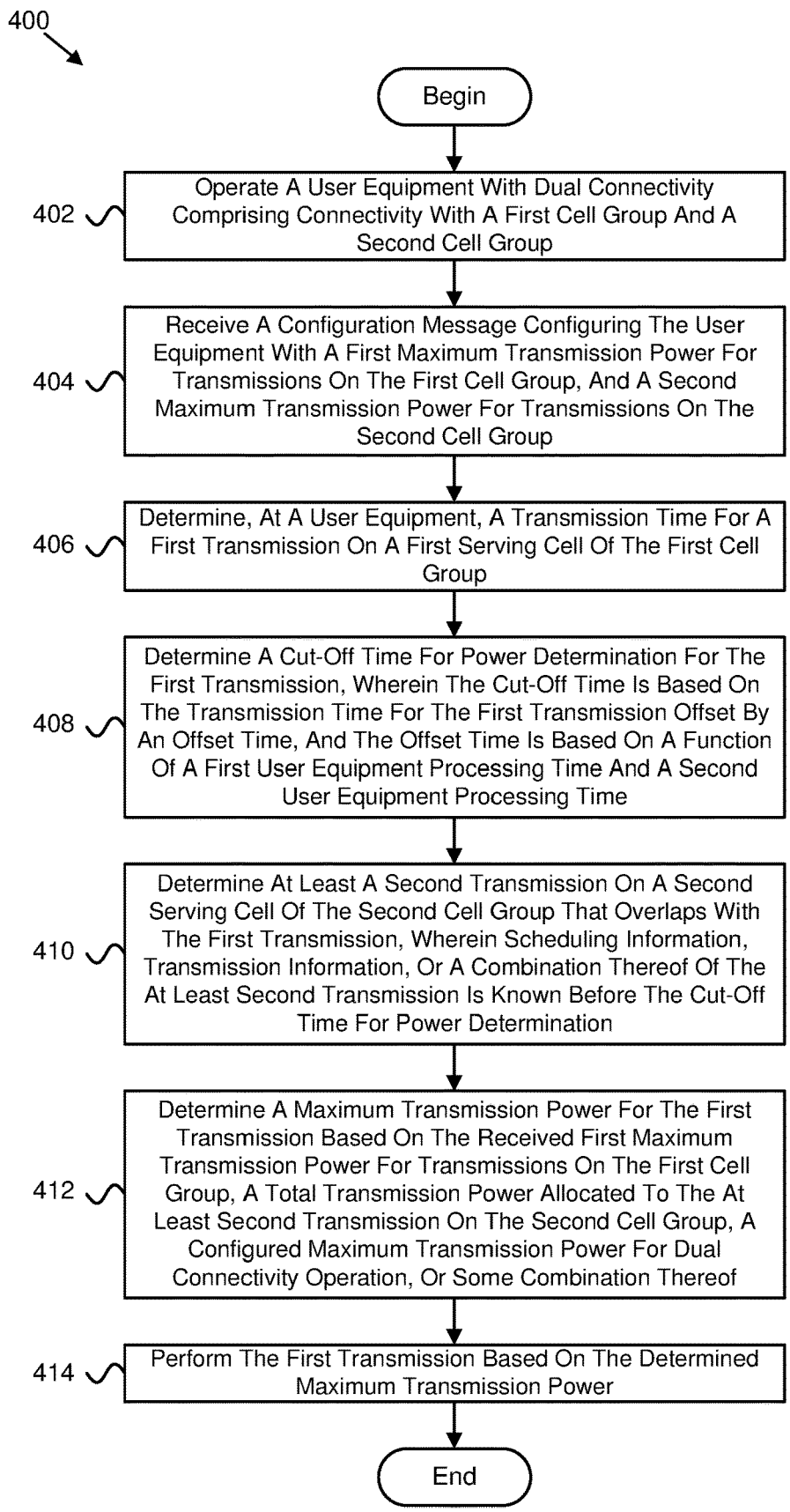
FIG. 4 is a flow chart diagram illustrating one embodiment of a method for transmission power for dual connectivity.

FIG. 4 is a flow chart diagram illustrating one embodiment of a method 400 for transmission power for dual connectivity. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes operating 402 a user equipment with dual connectivity comprising connectivity with a first cell group and a second cell group. In certain embodiments, the method 400 includes receiving 404 a configuration message configuring the user equipment with a first maximum transmission power for transmissions on the first cell group, and a second maximum transmission power for transmissions on the second cell group. In some embodiments, the method 400 includes determining 406, at a user equipment, a transmission time for a first transmission on a first serving cell of the first cell group. In various embodiments, the method 400 includes determining 408 a cut-off time for power determination for the first transmission, wherein the cut-off time is based on the transmission time for the first transmission offset by an offset time, and the offset time is based on a function of a first user equipment processing time and a second user equipment processing time. In certain embodiments, the method 400 includes determining 410 at least a second transmission on a second serving cell of the second cell group that overlaps with the first transmission, wherein scheduling information, transmission information, or a combination thereof of the at least second transmission is known before the cut-off time for power determination. In some embodiments, the method 400 includes determining 412 a maximum transmission power for the first transmission based on the received first maximum transmission power for transmissions on the first cell group, a total transmission power allocated to the at least second transmission on the second cell group, a configured maximum transmission power for dual connectivity operation, or some combination thereof. In various embodiments, the method 400 includes performing 414 the first transmission based on the determined maximum transmission power.

In certain embodiments, the method 400 further comprises receiving a power sharing mode configuration parameter indicating that the user equipment is configured for a semi-static power sharing operation or a dynamic power sharing operation with dual connectivity. In some embodiments, the method 400 includes, in response to receiving the power sharing mode configuration parameter indicating that the user equipment is configured for the dynamic power sharing operation, determining the cut-off time for power determination for the first transmission. In various embodiments, the method 400 includes, in response to receiving the power sharing mode configuration parameter indicating that the user equipment is configured for the semi-static power sharing operation, determining that the maximum transmission power for the first transmission is the received first maximum transmission power for transmissions on the first cell group.

In one embodiment, the offset time comprises a first offset time or a second offset time. In certain embodiments, the first offset time is for dynamic power sharing without look-ahead operation, the second offset time is for dynamic power sharing with look-ahead operation, and the first offset time is larger than the second offset time. In some embodiments, the first user equipment processing time and the second user equipment processing time are different, and the first user equipment processing time and the second user equipment processing time are selected from a group comprising: a physical uplink shared channel preparation time without control information multiplexing ($T_{proc,2}$), a physical uplink shared channel preparation time with control information other than aperiodic channel state information multiplexing and overlapping physical uplink control and physical uplink shared channels ($T_{proc,2}^{mux}$), a physical uplink shared channel preparation time with aperiodic channel state information multiplexing and overlapping physical uplink control and physical uplink shared channels ($T_{proc,CSI}^{mux}$), a physical uplink shared channel preparation time with control information ($T_{proc,CSI}$), and a number of symbol duration time.

In various embodiments, the method 400 further comprises operating the first cell group and the second group in a same frequency range, wherein the frequency range is a first frequency range or a second frequency range. In one embodiment, the first cell group is a secondary cell group, and the second cell group is a master cell group, and the method further comprises: determining whether a total user equipment transmit power for transmissions exceeds a maximum user equipment output power, wherein the transmissions comprise the first transmission on the secondary cell group and the at least second transmission on the master cell group; and in response to determining that the total user equipment transmit power for transmissions exceeds the maximum user equipment output power, prioritizing power allocation for the at least second transmission on the master cell group over the first transmission on the secondary cell group.

In certain embodiments, the method 400 further comprises: determining a third transmission on the first cell group that overlaps with the first transmission; determining a priority level for the first transmission and the third transmission based on a pre-defined priority order; and prioritizing power allocation for the first transmission and the third transmission based on the determined priority level. In some embodiments, the cut-off time for power determination for the first transmission is based on a numerology of the first serving cell of the first cell group on which the first transmission occurs and a numerology of a cell of the first cell group that schedules or configures the first transmission.

In various embodiments, determining the maximum transmission power for the first transmission is exclusive of any transmissions that overlap with the first transmission and for which the scheduling information, the transmission information, or a combination thereof is known after the determined cut-off time for power determination. In one embodiment, the determined cut-off time for power determination corresponds to a time instant at which the scheduling information, the transmission information, or a combination thereof of the first transmission is received.

In one embodiment, a method comprises: operating a user equipment with dual connectivity comprising connectivity with a first cell group and a second cell group; receiving a configuration message (e.g., a higher layer configuration message, where the higher layer is higher than a physical layer) configuring the user equipment with a first maximum transmission power for transmissions on the first cell group, and a second maximum transmission power for transmissions on the second cell group; determining, at a user equipment, a transmission time for a first transmission on a first serving cell of the first cell group; determining a cut-off time for power determination for the first transmission, wherein the cut-off time is based on the transmission time for the first transmission offset by an offset time, and the offset time is based on a function of a first user equipment processing time and a second user equipment processing time; determining at least a second transmission on a second serving cell of the second cell group that overlaps with the first transmission, wherein scheduling information, transmission information, or a combination thereof of the at least second transmission is known before the cut-off time for power determination; determining a maximum transmission power for the first transmission based on the received first maximum transmission power for transmissions on the first cell group, a total transmission power allocated to the at least second transmission on the second cell group, a configured maximum transmission power for dual connectivity operation, or some combination thereof; and performing the first transmission based on the determined maximum transmission power.

In certain embodiments, the method further comprises receiving a power sharing mode configuration parameter (e.g., a higher layer power sharing mode configuration parameter) indicating that the user equipment is configured for a semi-static power sharing operation or a dynamic power sharing operation with dual connectivity.

In some embodiments, the method includes, in response to receiving the power sharing mode configuration parameter indicating that the user equipment is configured for the dynamic power sharing operation, determining the cut-off time for power determination for the first transmission.

In various embodiments, the method includes, in response to receiving the power sharing mode configuration parameter indicating that the user equipment is configured for the semi-static power sharing operation, determining that the maximum transmission power for the first transmission is the received first maximum transmission power for transmissions on the first cell group.

In one embodiment, the offset time comprises a first offset time or a second offset time.

In certain embodiments, the first offset time is for dynamic power sharing without look-ahead operation, the second offset time is for dynamic power sharing with look-ahead operation, and the first offset time is larger than the second offset time.

In some embodiments, the first user equipment processing time and the second user equipment processing time are different, and the first user equipment processing time and the second user equipment processing time are selected from a group comprising: a physical uplink shared channel preparation time without control information multiplexing ($T_{proc,2}$), a physical uplink shared channel preparation time with control information other than aperiodic channel state information multiplexing and overlapping physical uplink control and physical uplink shared channels ($T_{proc,2}^{mux}$), a physical uplink shared channel preparation time with aperiodic channel state information multiplexing and overlapping physical uplink control and physical uplink shared channels ($T_{proc,CSI}^{mux}$), a physical uplink shared channel preparation time with control information ($T_{proc,CSI}$), and a number of symbol duration time.

In various embodiments, the method further comprises operating the first cell group and the second group in a same frequency range, wherein the frequency range is a first frequency range or a second frequency range.

In one embodiment, the first cell group is a secondary cell group, and the second cell group is a master cell group, and the method further comprises: determining whether a total user equipment transmit power for transmissions exceeds a maximum user equipment output power, wherein the transmissions comprise the first transmission on the secondary cell group and the at least second transmission on the master cell group; and in response to determining that the total user equipment transmit power for transmissions exceeds the maximum user equipment output power, prioritizing power allocation for the at least second transmission on the master cell group over the first transmission on the secondary cell group.

In certain embodiments, the method further comprises: determining a third transmission on the first cell group that overlaps with the first transmission; determining a priority level for the first transmission and the third transmission based on a pre-defined priority order; and prioritizing power allocation for the first transmission and the third transmission based on the determined priority level.

In some embodiments, the cut-off time for power determination for the first transmission is based on a numerology of the first serving cell of the first cell group on which the first transmission occurs and a numerology of a cell of the first cell group that schedules or configures the first transmission.

In various embodiments, determining the maximum transmission power for the first transmission is exclusive of any transmissions that overlap with the first transmission and for which the scheduling information, the transmission information, or a combination thereof is known after the determined cut-off time for power determination.

In one embodiment, the determined cut-off time for power determination corresponds to a time instant at which the scheduling information, the transmission information, or a combination thereof of the first transmission is received.

In one embodiment, an apparatus comprises a user equipment, wherein the apparatus further comprises: a processor that operates the apparatus with dual connectivity comprising connectivity with a first cell group and a second cell group; and a receiver that receives a configuration message configuring the apparatus with a first maximum transmission power for transmissions on the first cell group, and a second maximum transmission power for transmissions on the second cell group; wherein the processor: determines a transmission time for a first transmission on a first serving cell of the first cell group; determines a cut-off time for power determination for the first transmission, wherein the cut-off time is based on the transmission time for the first transmission offset by an offset time, and the offset time is based on a function of a first user equipment processing time and a second user equipment processing time; determines at least a second transmission on a second serving cell of the second cell group that overlaps with the first transmission, wherein scheduling information, transmission information, or a combination thereof of the at least second transmission is known before the cut-off time for power determination; determines a maximum transmission power for the first transmission based on the received first maximum transmission power for transmissions on the first cell group, a total transmission power allocated to the at least second transmission on the second cell group, a configured maximum transmission power for dual connectivity operation, or some combination thereof; and performs the first transmission based on the determined maximum transmission power.

In certain embodiments, the receiver receives a power sharing mode configuration parameter indicating that the apparatus is configured for a semi-static power sharing operation or a dynamic power sharing operation with dual connectivity.

In some embodiments, in response to the receiver receiving the power sharing mode configuration parameter indicating that the apparatus is configured for the dynamic power sharing operation, the processor determines the cut-off time for power determination for the first transmission.

In various embodiments, in response to the receiver receiving the power sharing mode configuration parameter indicating that the apparatus is configured for the semi-static power sharing operation, the processor determines that the maximum transmission power for the first transmission is the received first maximum transmission power for transmissions on the first cell group.

In one embodiment, the offset time comprises a first offset time or a second offset time.

In certain embodiments, the first offset time is for dynamic power sharing without look-ahead operation, the second offset time is for dynamic power sharing with look-ahead operation, and the first offset time is larger than the second offset time.

In some embodiments, the first user equipment processing time and the second user equipment processing time are different, and the first user equipment processing time and the second user equipment processing time are selected from a group comprising: a physical uplink shared channel preparation time without control information multiplexing ($T_{proc,2}$), a physical uplink shared channel preparation time with control information other than aperiodic channel state information multiplexing and overlapping physical uplink control and physical uplink shared channels ($T_{proc,2}^{mux}$), a physical uplink shared channel preparation time with aperiodic channel state information multiplexing and overlapping physical uplink control and physical uplink shared channels ($T_{proc,CSI}^{mux}$), a physical uplink shared channel preparation time with control information ($T_{proc,CSI}$), and a number of symbol duration time.

In various embodiments, the processor operates the first cell group and the second group in a same frequency range, and the frequency range is a first frequency range or a second frequency range.

In one embodiment, the first cell group is a secondary cell group, and the second cell group is a master cell group, and the processor: determines whether a total user equipment transmit power for transmissions exceeds a maximum user equipment output power, wherein the transmissions comprise the first transmission on the secondary cell group and the at least second transmission on the master cell group; and in response to determining that the total user equipment transmit power for transmissions exceeds the maximum user equipment output power, prioritizes power allocation for the at least second transmission on the master cell group over the first transmission on the secondary cell group.

In certain embodiments, the processor: determines a third transmission on the first cell group that overlaps with the first transmission; determines a priority level for the first transmission and the third transmission based on a predefined priority order; and prioritizes power allocation for the first transmission and the third transmission based on the determined priority level.

In some embodiments, the cut-off time for power determination for the first transmission is based on a numerology of the first serving cell of the first cell group on which the first transmission occurs and a numerology of a cell of the first cell group that schedules or configures the first transmission.

In various embodiments, the processor determining the maximum transmission power for the first transmission is exclusive of any transmissions that overlap with the first transmission and for which the scheduling information, the transmission information, or a combination thereof is known after the determined cut-off time for power determination.

In one embodiment, the determined cut-off time for power determination corresponds to a time instant at which the scheduling information, the transmission information, or a combination thereof of the first transmission is received.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
operating a user equipment with dual connectivity comprising connectivity with a first cell group and a second cell group;
receiving a configuration message configuring the user equipment with a first maximum transmission power for transmissions on the first cell group, and a second maximum transmission power for transmissions on the second cell group;
determining, at a user equipment, a transmission time for a first transmission on a first serving cell of the first cell group;
determining a cut-off time for power determination for the first transmission, wherein the cut-off time is based on the transmission time for the first transmission which is offset by an offset time, and the offset time is based on a function of a first user equipment processing time and a second user equipment processing time;
determining at least a second transmission on a second serving cell of the second cell group that overlaps with the first transmission, wherein scheduling information, transmission information, or a combination thereof of the at least second transmission is known before the cut-off time for the power determination;
determining a maximum transmission power for the first transmission based on received first maximum transmission power for transmissions on the first cell group, a total transmission power allocated to the at least second transmission on the second cell group, a configured maximum transmission power for the dual connectivity operation, or some combination thereof; and
performing the first transmission based on the determined maximum transmission power.

2. The method of claim 1, further comprising receiving a power sharing mode configuration parameter indicating that the user equipment is configured for a semi-static power sharing operation or a dynamic power sharing operation with dual connectivity.

3. The method of claim 2, wherein, in response to receiving the power sharing mode configuration parameter indicating that the user equipment is configured for the dynamic power sharing operation, determining the cut-off time for power determination for the first transmission.

4. The method of claim 2, wherein, in response to receiving the power sharing mode configuration parameter indicating that the user equipment is configured for the semi-static power sharing operation, determining that the maximum transmission power for the first transmission is the received first maximum transmission power for transmissions on the first cell group.

5. The method of claim 1, wherein the offset time comprises a first offset time or a second offset time.

6. The method of claim 5, wherein the first offset time is for dynamic power sharing without look-ahead operation, the second offset time is for dynamic power sharing with look-ahead operation, and the first offset time is larger than the second offset time.

7. The method of claim 1, wherein the first user equipment processing time and the second user equipment processing time are different, and the first user equipment processing time and the second user equipment processing time are selected from a group comprising: a physical uplink shared channel preparation time without control information multiplexing ($T_{proc,2}$), a physical uplink shared channel preparation time with control information other than aperiodic channel state information multiplexing and overlapping physical uplink control and physical uplink shared channels ($T_{proc,2}^{mux}$), a physical uplink shared channel preparation time with aperiodic channel state information multiplexing and overlapping physical uplink control and physical uplink shared channels ($T_{proc,CSI}^{mux}$), a physical uplink shared channel preparation time with control information ($T_{proc,CSI}$), and a number of symbol duration time.

8. The method of claim 1, wherein the first cell group is a secondary cell group, and the second cell group is a master cell group, and the method further comprises:
determining whether a total user equipment transmit power for transmissions exceeds a maximum user equipment output power, wherein the transmissions comprise the first transmission on the secondary cell group and the at least second transmission on the master cell group; and
in response to determining that the total user equipment transmit power for transmissions exceeds the maximum user equipment output power, prioritizing power allocation for the at least second transmission on the master cell group over the first transmission on the secondary cell group.

9. The method of claim 8, further comprising:
determining a third transmission on the first cell group that overlaps with the first transmission;
determining a priority level for the first transmission and the third transmission based on a pre-defined priority order; and
prioritizing power allocation for the first transmission and the third transmission based on the determined priority level.

10. The method of claim 1, wherein the cut-off time for power determination for the first transmission is based on a numerology of the first serving cell of the first cell group on which the first transmission occurs and a numerology of a cell of the first cell group that schedules or configures the first transmission.

11. The method of claim 1, wherein determining the maximum transmission power for the first transmission is exclusive of any transmissions that overlap with the first transmission and for which the scheduling information, the transmission information, or a combination thereof is known after the determined cut-off time for power determination.

12. The method of claim 1, wherein the determined cut-off time for power determination corresponds to a time instant at which the scheduling information, the transmission information, or a combination thereof of the first transmission is received.

13. An apparatus comprising a user equipment, wherein the apparatus further comprises:
a processor that operates the apparatus with dual connectivity comprising connectivity with a first cell group and a second cell group; and
a receiver that receives a configuration message configuring the apparatus with a first maximum transmission power for transmissions on the first cell group, and a second maximum transmission power for transmissions on the second cell group;
wherein the processor:
determines a transmission time for a first transmission on a first serving cell of the first cell group;
determines a cut-off time for power determination for the first transmission, wherein the cut-off time is based on the transmission time for the first transmission which is offset by an offset time, and the offset time is based on a function of a first user equipment processing time and a second user equipment processing time;
determines at least a second transmission on a second serving cell of the second cell group that overlaps with the first transmission, wherein scheduling information, transmission information, or a combination thereof of the at least second transmission is known before the cut-off time for the power determination;
determines a maximum transmission power for the first transmission based on received first maximum transmission power for transmissions on the first cell group, a total transmission power allocated to the at least second transmission on the second cell group, a configured maximum transmission power for the dual connectivity operation, or some combination thereof; and
performs the first transmission based on the determined maximum transmission power.

14. The apparatus of claim 13, wherein the receiver receives a power sharing mode configuration parameter indicating that the apparatus is configured for a semi-static power sharing operation or a dynamic power sharing operation with dual connectivity.

15. The apparatus of claim 14, wherein, in response to the receiver receiving the power sharing mode configuration parameter indicating that the apparatus is configured for the dynamic power sharing operation, the processor determines the cut-off time for power determination for the first transmission.

16. The apparatus of claim 14, wherein, in response to the receiver receiving the power sharing mode configuration parameter indicating that the apparatus is configured for the semi-static power sharing operation, the processor determines that the maximum transmission power for the first transmission is the received first maximum transmission power for transmissions on the first cell group.

17. The apparatus of claim 13, wherein the offset time comprises a first offset time or a second offset time.

18. The apparatus of claim 17, wherein the first offset time is for dynamic power sharing without look-ahead operation, the second offset time is for dynamic power sharing with look-ahead operation, and the first offset time is larger than the second offset time.

19. The apparatus of claim 13, wherein the first user equipment processing time and the second user equipment processing time are different, and the first user equipment processing time and the second user equipment processing time are selected from a group comprising: a physical uplink shared channel preparation time without control information multiplexing ($T_{proc,2}$), a physical uplink shared channel preparation time with control information other than aperiodic channel state information multiplexing and overlapping physical uplink control and physical uplink shared channels ($T_{proc,2}^{mux}$), a physical uplink shared channel preparation time with aperiodic channel state information multiplexing and overlapping physical uplink control and physical uplink shared channels ($T_{proc,CSI}^{mux}$), a physical uplink shared channel preparation time with control information ($T_{proc,CSI}$), and a number of symbol duration time.

20. The apparatus of claim 13, wherein the first cell group is a secondary cell group, and the second cell group is a master cell group, and the processor:
- determines whether a total user equipment transmit power for transmissions exceeds a maximum user equipment output power, wherein the transmissions comprise the first transmission on the secondary cell group and the at least second transmission on the master cell group; and
- in response to determining that the total user equipment transmit power for transmissions exceeds the maximum user equipment output power, prioritizes power allocation for the at least second transmission on the master cell group over the first transmission on the secondary cell group.

* * * * *